Nov. 8, 1960   P. BAUER   2,959,061
INDEXING MECHANISMS
Filed June 4, 1958
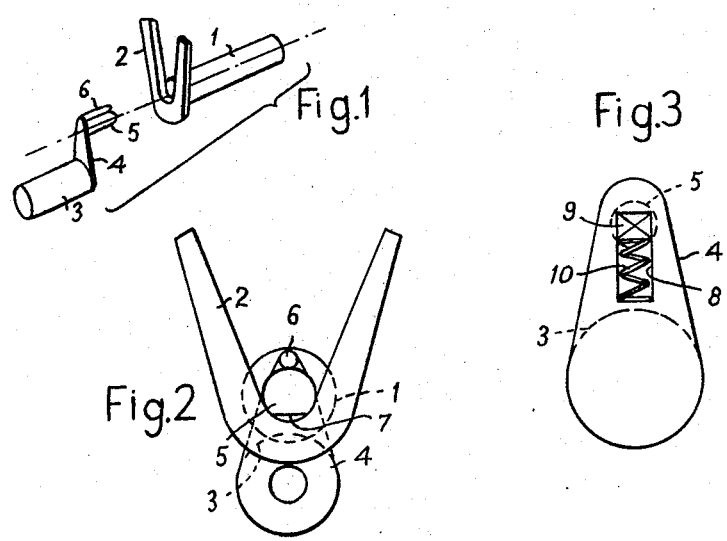
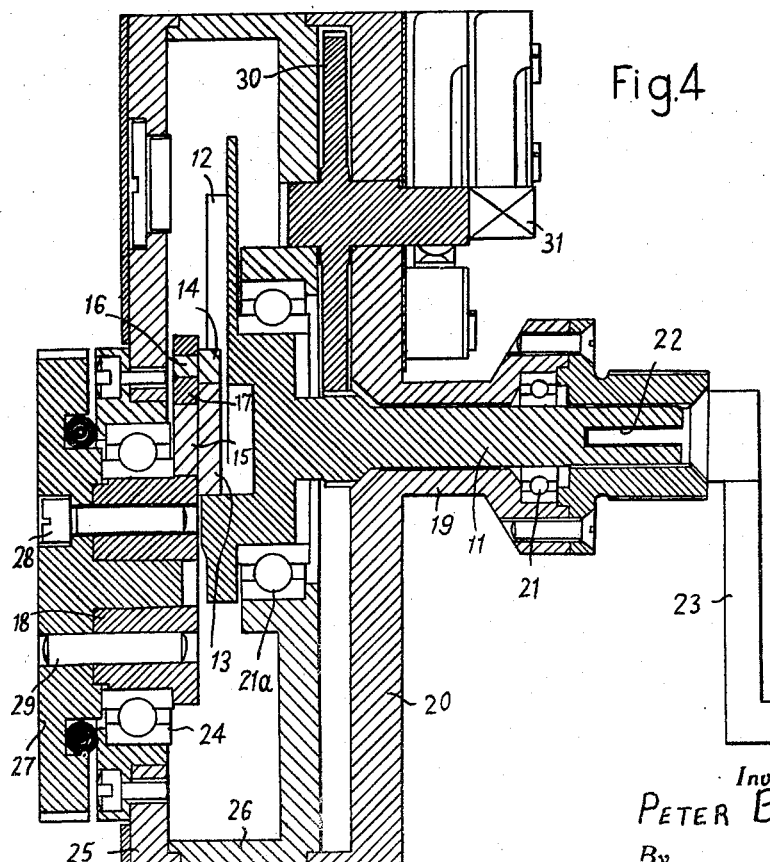
Inventor
PETER BAUER
By
Holcombe, Wetherill & Brisebois
Attorneys

United States Patent Office 2,959,061
Patented Nov. 8, 1960

2,959,061

INDEXING MECHANISMS

Peter Bauer, Cambridge, England, assignor to Pye Limited, Cambridge, England, a British company Filed June 4, 1958, Ser. No. 739,768

Claims priority, application Great Britain June 5, 1957

6 Claims. (Cl. 74—84)

The present invention relates to mechanical indexing systems for incorporation between a driving and a driven shaft.

The requirements of an indexing mechanism are that the driven shaft should be easily rotatable by the driving mechanism when in the unlocked state but held securely without backlash, when in the locked or indexed state. This second requirement is satisfied by the conventional Geneva mechanism, but since the movement on a Geneva mechanism only occurs over a small part of the operating cycle the load imposed on the system during the movement is quite high. Moreover, the form of motion achieved by a Geneva mechanism is difficult to control.

It is a more particular object of the present invention to produce an indexing mechanism which will operate during at least 180° of revolution of the driving shaft and which enables the motion of the driven shaft to follow almost any desired pattern.

According to the invention there is provided an indexing mechanism which comprises a forked lever mounted on a driving shaft, said lever engaging a crank pin or the like projecting from a crank on a driven shaft, the axis of the driven shaft being offset from the axis of the driving shaft by a distance substantially equal to the length of the crank arm.

The driven crank is in the locked or indexed position when the centre of the crank pin or the like coincides with the axis of the driving shaft.

Preferably means are provided to initiate the movement of the driven crank and this means may take the form of a further pin, smaller than the said crank pin, and attached to the crank arm adjacent the crank pin, this smaller pin being driven by the fork to push the driven shaft out of the indexed position.

In order that the invention may be more clearly understood reference will now be made to the accompanying drawings which show certain embodiments thereof by way of example and in which:

Figure 1 shows an "exploded" perspective view of the essential elements of the indexing mechanism, Figure 2 shows an end view of elements of Figure 1 in the operative position, Figure 3 shows an end view of a modification, and Figure 4 shows how the mechanism of the invention may be utilised for driving the lens turret of a camera, for example a television camera.

Referring to Figure 1, the driving shaft of the mechanism is shown at 1 and on one end thereof there is mounted a forked lever 2. The driven shaft is shown at 3 and at one end thereof there is provided a crank 4 from which projects a crank pin 5 which crank pin is shaped to engage between the bifurcation of the forked lever 2 as can be seen more particularly in Figure 2. It will thus be seen that the axis of the driven shaft 3 is offset from the axis of the driving shaft 1 by a distance which is substantially equal to the length of the crank arm 4, i.e. equal to the distance between the axial centre of the pin 5 and the axial centre of the driven shaft 3.

The driven crank 4 is in the locked or indexed position when the axial centre of the crank pin 5 coincides with the axis of the driving shaft 1, which is the position actually shown in Figure 2 the driving shaft being shown in dotted lines in that figure.

A further pin 6 which is smaller than the pin 5 is attached to the crank arm 4 adjacent the crank pin and this smaller pin is contacted first by the fork 2 upon movement of the driving shaft 1 so as to push the driving shaft 3 out of the indexed position. This is clearly apparent from Figure 2 from which it will be seen that rotation of the fork 2 by the shaft 1 will produce no movement of the crank 4 as bifurcation of the fork will merely slide around the crank pin 5; however, as soon as the fork 2 contacts pin 6 the shaft 3 will be driven.

One revolution of the driving shaft 1 or the crank 4 brings the whole mechanism back to the indexed position shown at Figure 2. The output from the driven shaft 3 may be a complete revolution per single indexing.

It will be appreciated that the shape of the fork 2 is not limited to that shown in the drawings and that the type of motion produced in the driven shaft is a function of the relative dimensions and spacing of the crank and the shape of the fork faces. These dimensions, spacings and shapes may be varied to enable the driven shaft to follow almost any desired pattern.

In certain conditions it might be possible that there is a tendency for the device to stick as it approaches the indexed position and, therefore, means are preferably provided to produce a bias over a part of the cycle near the indexed position. This bias can be provided by forming a flat 7 on the underside of the crank pin 5 when in the indexed position as will be seen from Figure 2.

Alternatively, the arrangement of Figure 3 may be used in which the crank pin 5 is spring loaded. In this embodiment a slot 8 is formed in the crank 4 and the crank pin 5 is not secured to the crank but is engaged in the slot by providing shoulders or the like on opposite sides of a squared portion 9 of the pin in a manner which will be apparent to those skilled in the art. Between one face of the squared portion 9 and the base of the slot 8 there is provided a spring means 10 shown as a double leaf or zigzag spring. Obviously any other form of spring loading may be used as required. In this embodiment the crank pin may slide slightly down the crank against the action of the spring 10 if resistance is met during the movement of the mechanism. In this arrangement it is not necessary to provide the additional pin 6 as the spring 10 will provide a bias away from the indexed position.

If desired the crank arm 4 may be made very slightly longer than the distance between the axis of the shafts 1 and 3 so that, in fact, there is no absolute dead position of the driven crank and this assists considerably both in returning to and moving away from the indexed position whilst if the eccentricity of the main crank pin 5 relative to the driving shaft 1 is kept small when it is in the index position the amount of movement of the driven shaft 3 within this position is negligible.

If desired the crank pin 5 and the small pin 6 may be free to revolve in the arrangement of Figures 1 and 2 so as to avoid friction losses and if desired also the two pins 5 and 6 may be combined together to form a pin shaped like the figure eight. The appearance of such a combined pin would be the same as that shown in Figures 1 and 2 and the function is the same.

The indexing mechanism according to the invention has a variety of uses and may for example be used for indexing turret mounted coils in electronic apparatus such as a tuning mechanism for television apparatus or for indexing camera lenses or, in fact, for all cases where a positive mechanical indexing arrangement is useful in the action of a driven member, for example machine tools and so on.

Referring now to Figure 4 which shows a section through a turret operating mechanism for camera lenses for use with a television camera, the driving shaft corresponding to shaft 1 of Figures 1 and 2 is shown at 11 and the fork at the end thereof is shown at 12. The main crank pin is shown at 13 and the smaller crank pin at 14 both of these pins being housed by their extensions 15 and 16 respectively in the crank 17 which is secured to the driven shaft 18.

The driving shaft 11 is borne by a bearing 19 in a back plate 20 and a ball bearings 21 and 21a are provided to take up the radial thrust. At the extremity of shaft 11 there is provided a keyway 22 into which fits a handle member 23 to effect rotation of the driving shaft as desired. The driven shaft 18 is carried in a bearing 24 suitably carried in a front plate 25 of a casing 26 and is secured to a turret driving gear-wheel 27 by means of screws 28 and dowels 29. Suitable bearing and rubbing surfaces are provided as shown but further details need not be given here since this arrangement forms no part of the invention as such. The driving shaft 11 may be made to rotate other members, for example an indicator gear 30 having a squared take-off end 31.

Where it is desired to control heavy items, for example for the larger kind of television camera where the lenses are very heavy it is preferable to employ a fork that has parallel faces instead of obliquely positioned faces so as to avoid blacklash because the excessive weight of the lens tends to pull the driven shaft over from one side of the fork to the other if the fork arms are oblique as shown in the drawings. This means that the manipulation is not quite so effortless as with the arrangements herein illustrated and the non-effective angle of the control handle, which in the embodiment of Figure 4 is approximately 30° either side of the index point, is less, but there are no other disadvantages.

It will be apparent that many modifications and variations of the specific details given may be made without exceeding the scope of the invention as defined by the appended claims.

I claim:

1. An indexing mechanism comprising a driving shaft, a forked lever mounted at the end of said driving shaft, said forked lever comprising two arms, a driven shaft, a crank on said driven shaft, means for initiating the movement of said crank, and a crank pin projecting from said crank, said crank pin engaging in the angle between said arms and being coaxial with said driving shaft in the indexed position, the axis of said driven shaft being offset from the axis of said driving shaft by a distance approximately equal to the length of said crank, said crank pin being in contact with one of said arms throughout a complete circular movement of 360°.

2. An indexing mechanism comprising a driving shaft, a forked lever mounted at the end of said driving shaft, said forked lever comprising two arms, a driven shaft, a crank on said driven shaft, a crank pin projecting from said crank, said crank pin engaging in the angle between said arms and being coaxial with said driving shaft in the indexed position the axis of said driven shaft being offset from the axis of said driving shaft by a distance approximately equal to the length of said crank and means for initiating the movement of said crank, said crank pin being in contact with one of said arms throughout a complete circular movement of 360°.

3. An indexing mechanism according to claim 2, in which said initiating means comprises a further pin smaller than said crank pin and attached to said crank adjacent said crank pin.

4. An indexing mechanism according to claim 2, in which the means for initiating the movement of said driven crank comprises a spring loading for said crank pin, said crank pin being freely movable in a slot in said crank and spring means being interposed between a part of said crank pin within said slot and another part of said slot.

5. An indexing mechanism comprising a driving shaft, a forked lever mounted at the end of said driving shaft, said forked lever comprising two arms at an acute angle to each other, a driven shaft, a crank on said driven shaft, a crank pin projecting from said crank, said crank pin engaging in the angle between said arms and being coaxial with said driving shaft in the indexed position, the axis of said driven shaft being offset from the axis of said driving shaft by a distance approximately equal to the length of said crank, and a second pin having a diameter less than that of said crank pin but of the same axial length attached to said crank adjacent said crank pin, said crank pin being in contact with one of said arms throughout a complete circular movement of 360°, said second pin being contacted by an arm of said forked lever only after an initial rotational movement of said driving shaft and with it said forked lever.

6. A turret operating mechanism for camera lenses for use with a television camera comprising a driving shaft, a forked lever mounted at the end of said driving shaft, said forked lever comprising two arms at an acute angle to each other, a driven shaft, a casing having a front plate, a bearing in said front plate supporting said driven shaft, means for connecting said driven shaft to a turret driving gear-wheel, a crank on said driven shaft, a crank pin projecting from said crank, said crank pin engaging in the angle between said arms and being coaxial with said driving shaft in the indexed position, the axis of said driven shaft being offset from the axis of said driving shaft by a distance approximately equal to the length of said crank, and a second pin having a diameter less than that of said crank pin but of the same axial length attached to said crank adjacent said crank pin, said crank pin being in contact with one of said arms throughout a complete circular movement of 360°, said second pin being contacted by an arm of said forked lever only after an initial rotational movement of said driving shaft and with it said forked lever.

References Cited in the file of this patent

UNITED STATES PATENTS

| | | |
|---|---|---|
| 2,508,057 | Bishop | May 16, 1950 |

FOREIGN PATENTS

| | | |
|---|---|---|
| 518,172 | Belgium | Mar. 31, 1953 |
| 531,549 | France | Oct. 26, 1921 |
| 724,730 | Germany | Dec. 31, 1938 |

OTHER REFERENCES

Machine Design, pp. 124–131, Sept. 20, 1956.